United States Patent [19]
Domange

[11] Patent Number: 5,829,556
[45] Date of Patent: Nov. 3, 1998

[54] DAMPER DEVICE, OF THE TYPE WITH HYDROSTATIC COMPRESSION OF ELASTOMER, AND ITS APPLICATIONS

[75] Inventor: Bruno Domange, Maisons Lafitte, France

[73] Assignee: Jarret, Asnieres, France

[21] Appl. No.: 809,623

[22] PCT Filed: Nov. 8, 1995

[86] PCT No.: PCT/FR95/01475

§ 371 Date: May 15, 1997

§ 102(e) Date: May 15, 1997

[87] PCT Pub. No.: WO96/15389

PCT Pub. Date: May 23, 1996

[30] Foreign Application Priority Data

Nov. 14, 1994 [FR] France .................................. 94/13618

[51] Int. Cl.⁶ .................................. F16F 9/20; F16F 9/30
[52] U.S. Cl. .................. 188/268; 188/312; 267/64.13
[58] Field of Search ................. 188/268, 282.5, 188/282.9, 312, 322.2; 267/64.13

[56] References Cited

U.S. PATENT DOCUMENTS

| | | | |
|---|---|---|---|
| 3,053,526 | 9/1962 | Kendall | 188/312 |
| 3,368,697 | 2/1968 | Carlsar | 188/312 |
| 3,831,626 | 8/1974 | Peddinghaus | 188/282.5 |
| 4,867,286 | 9/1989 | Tayla | 188/312 |
| 5,207,300 | 5/1993 | Engel et al. | 188/282.5 |
| 5,265,392 | 11/1993 | Pedrocco . | |
| 5,277,283 | 1/1994 | Yauraoka et al. | 188/282.5 |

FOREIGN PATENT DOCUMENTS

| | | |
|---|---|---|
| 3041549 | 5/1981 | Germany . |
| 3508574 | 9/1986 | Germany . |
| 3842158 | 6/1990 | Germany . |
| 1033810 | 7/1963 | United Kingdom . |
| 1137219 | 12/1968 | United Kingdom . |
| 2277571 | 11/1994 | United Kingdom . |

Primary Examiner—Robert J. Oberleitner
Assistant Examiner—Chirs Schwartz
Attorney, Agent, or Firm—Rothwell, Figg, Ernst & Kurz

[57] ABSTRACT

A damper variably moderates movement of a piston on a rod in a cylinder filled with highly pressurized elastomeric gum. An axial bore through the piston allows relative ease of movement when a relatively low force is applied to a rod driving the cylinder. A high stress or acceleration on the rod forces a steel washer carried on the cylinder to deform and block the bore. The stiffness of the washer is proportioned to the ability of the clearance of the piston in the cylinder and the pressure and stiffness of the gum to establish a threshold. Damping is provided according to a preselected function, namely low initial resistance, and sharp increase is resistance to movement of the piston in response to stress exceeding the threshold. This function is suitable for damping in such applications as earthquake protection for structures and high stress protection for railroad beds.

12 Claims, 5 Drawing Sheets

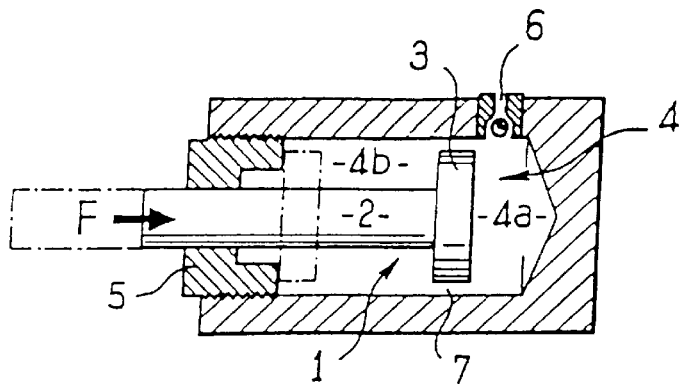
FIG_1 PRIOR ART
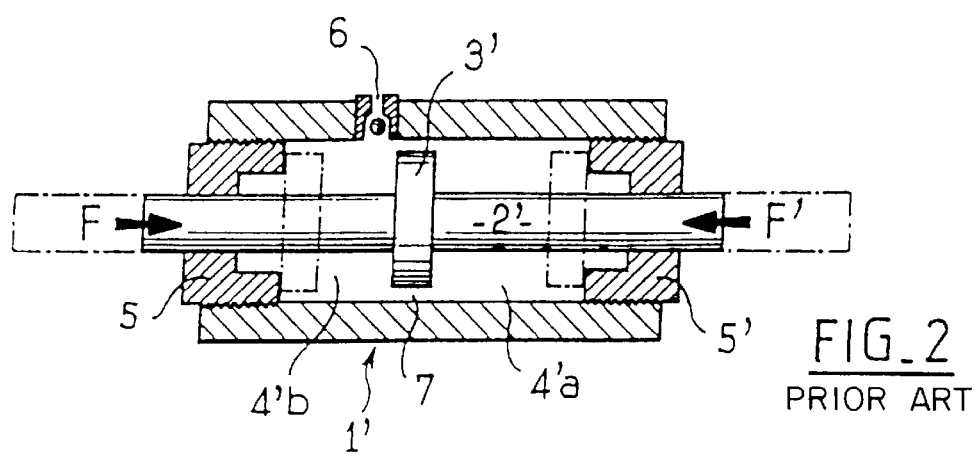
FIG_2 PRIOR ART
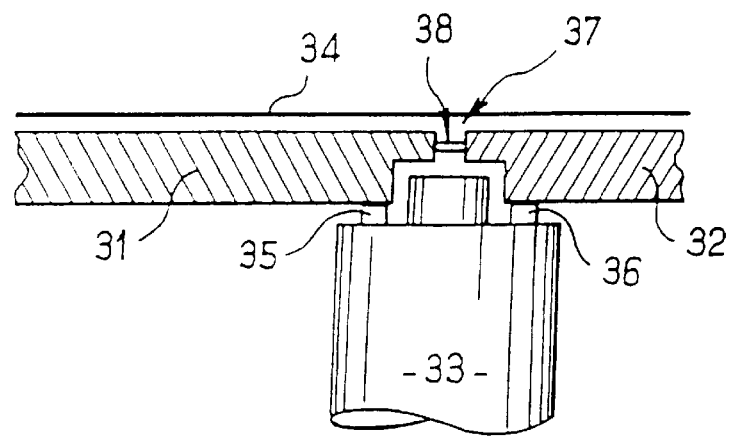
FIG_5
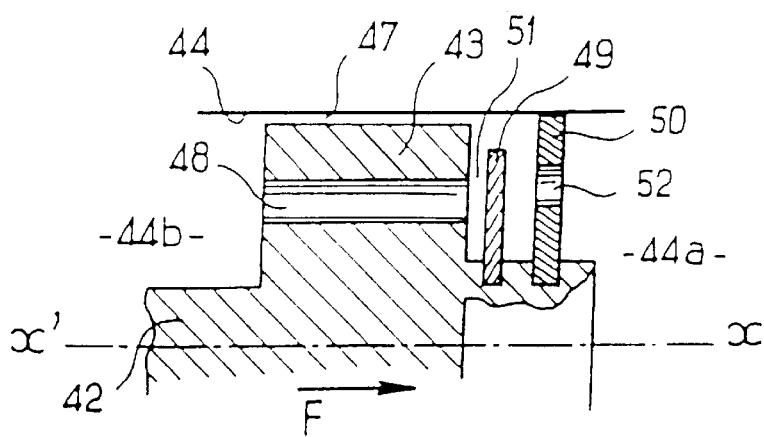
FIG_6

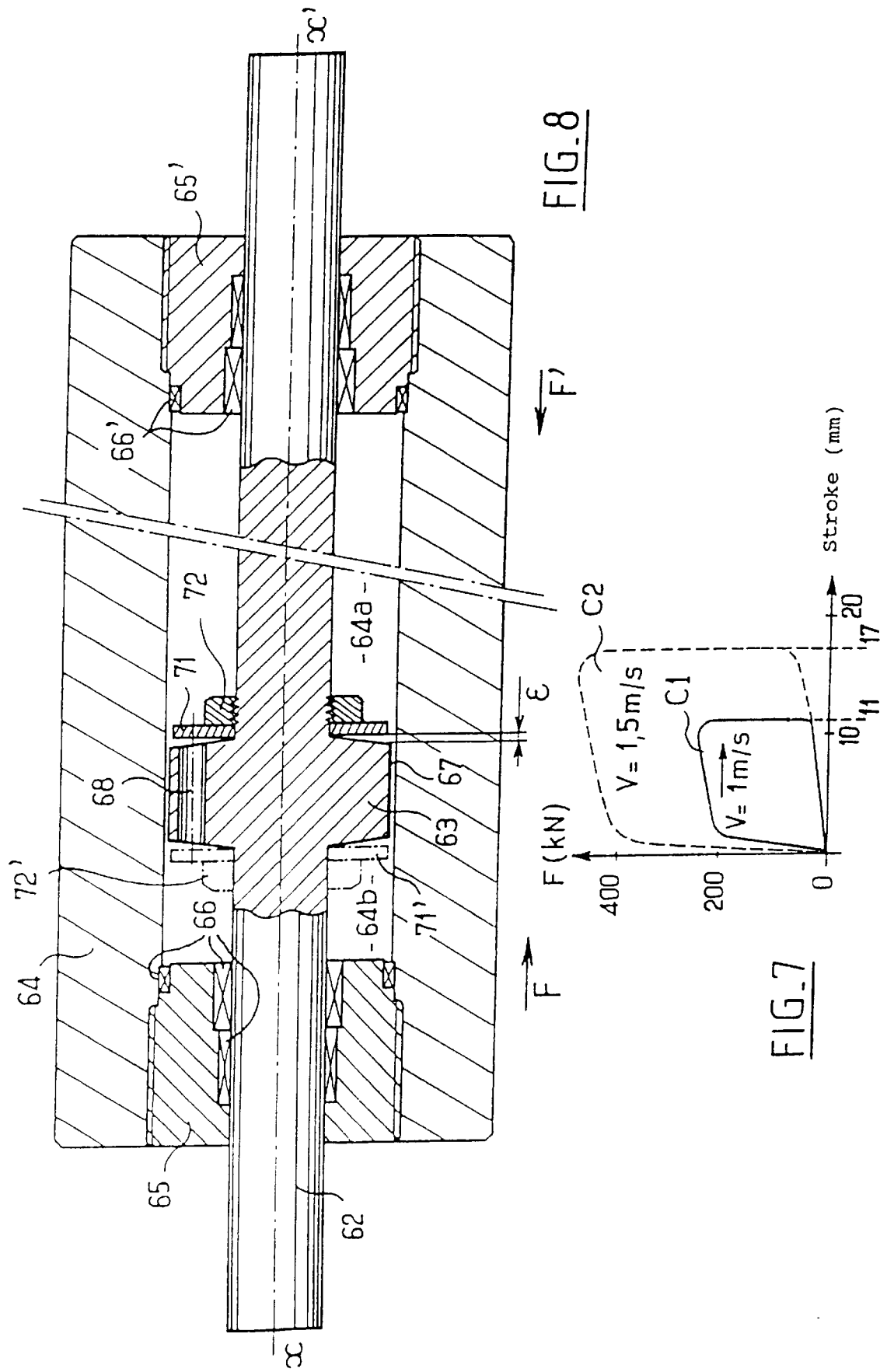

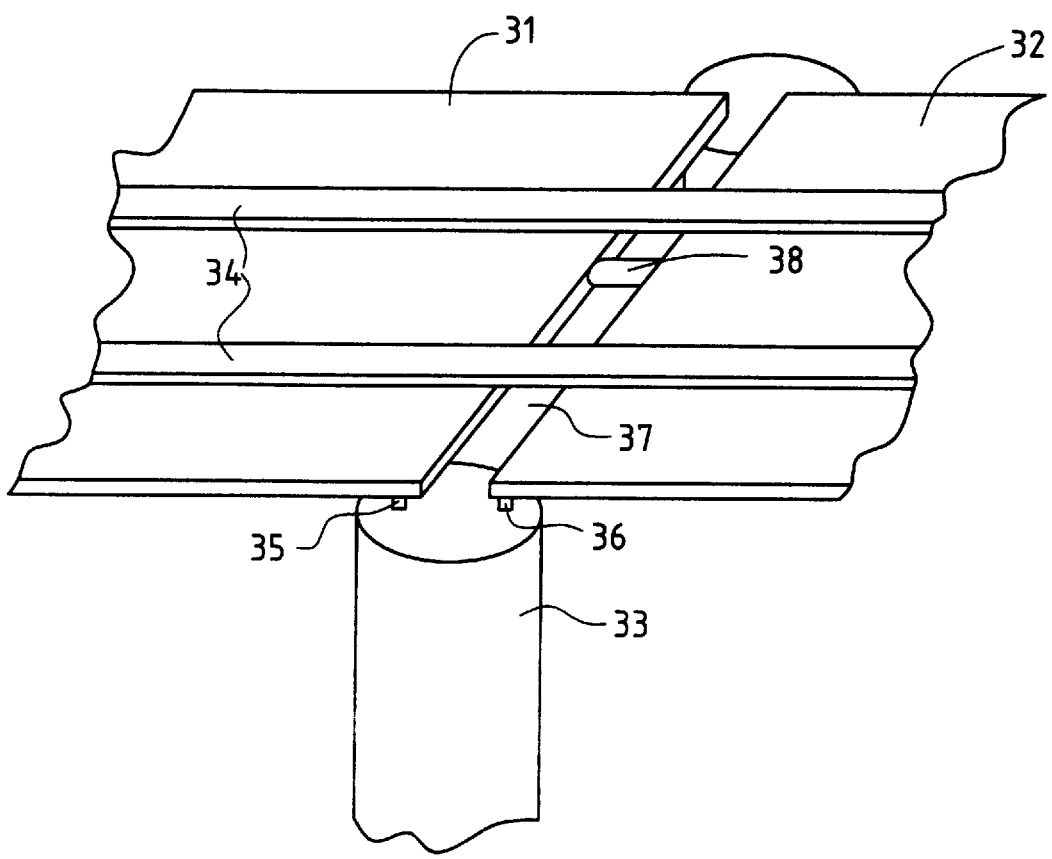

DAMPER DEVICE, OF THE TYPE WITH HYDROSTATIC COMPRESSION OF ELASTOMER, AND ITS APPLICATIONS

BACKGROUND OF THE INVENTION

1. Field of the Invention

The subject of the invention is a device forming a damper and/or damper spring of the type using at least one piston which moves in a cylinder filled with an elastomeric gum which is captive under pressure and the damping/return effect of which is essentially provided by the compression of the elastomer and its lamination in the cylinder during the displacement of the piston.

2. Description of Related Art

In this type of device of the prior art, the principle of which, for better understanding of the invention, has been illustrated with respect to FIGS. 1 and 2, the penetration of the piston provided with the reference 1 and constituted by the piston rod 2 and the plunger or the piston head 3, moves inside a cylinder chamber 4 enclosing a high viscosity elastomer.

The rod 2, 2' of the piston slides in a sealed manner in a guide bush 5 (FIG. 1) formed in the rear portion of the chamber, or in two guide bushes 5, 5' (FIG. 2) provided at the two ends of the chamber. At 6 there is indicated the filler valve allowing the chamber 4 to be filled before it is used for the first time.

When the piston 1 moves in the cylinder 4, the piston head 3 divides the chamber into two portions 4a, 4b, 4'a, 4'b which communicate through an annular passage 7 or through escape ports (not shown) provided in the plunger, forming a path for the escape and lamination of the elastomer.

With the type of elastomer used, and for the embodiment illustrated in FIG. 1, in which the piston rod 2 does not traverse from side to side of the chamber 4, it will be noted that for a pressure varying, for example, between 1 and 4,000 bar, the reduction in volume of the elastomer may be of the order of 15%.

In the embodiment in FIG. 2, in which the piston rod 2' traverses from side to side of the chamber 4 which is blocked at its two ends by the guide bushes 5, 5' respectively, there is no modification of the volume during the actuation of the piston.

The penetration of the piston, under static or dynamic stress, simultaneously causes hydraulic friction at the level of the circulation of the elastomer from the chamber 4a to the chamber 4b, and solid friction at the level of the piston 2, 2' and the bushes 5,5' under the action of the pressure of the sealing gaskets (not shown) which act on the piston.

The solid friction becomes greater as the pressure increases. The hydraulic friction produced by the lamination of the elastomer through the annular plunger/reservoir clearance or through the passages provided in the piston, becomes greater as the speed of displacement of the piston increases.

In the embodiment in FIG. 1, if the stress F on the piston rod 2 decreases or ceases, the elastomer relaxes and brings the piston back towards its original position. The complete return is effected by means of the initial pressure which serves, among other things, to overcome the solid friction.

The operation of such a damper device also forming a return spring may be determined precisely by calculation or experimentation and depending in particular:

on the nature of the elastomer used (and especially its greater or lesser viscosity), on the magnitude of the clearance left between the piston head and the cylinder in which it slides, on the length of the stroke of the piston, on the initial compression pressure of filling of the chamber, etc.

In the embodiment in FIG. 2, in view of the fact that the penetration of the piston rod 2' in one direction or the other does not modify the volume remaining to the elastomer in the chamber 4, there is no "return spring" function, the device functioning symmetrically according to whether the force is applied to the device in the direction of the arrow F or in the direction of the arrow F'.

But such devices do not make it possible to produce a stress transition, especially as a function of the speed.

The object of the invention is to modify the existing systems by allowing them to react in very different ways depending on the piston/cylinder displacement speeds to which they may be subjected.

In order to modify the operation of the damper device according to the shocks which it has to absorb and which are of a greater or lesser magnitude, it is already known to provide passage ports in the piston for the gum, which ports may be blocked by closure members which are resilient or otherwise and returned or not returned by springs.

But the known devices do not make it possible, up to a first operating threshold of the device, to bring only a minimal reaction force in opposition, and, as soon as a specific threshold of the speed of displacement is passed, to react almost instantaneously, by delivering the maximum absorption force which the device is capable of providing.

SUMMARY OF THE INVENTION

More precisely, the device according to the invention, forming a shock absorber and movement limiter of the type using at least one piston which moves in a cylinder filled with an elastomeric gum under high pressure, the damping effect, and optionally the return effect of which is essentially provided by the compression of the elastomer and its lamination in passages of reduced cross-section provided in the device in order to permit the passage of the gum from one side of the piston to the other during the operation of the device, the device additionally including means such as, especially, closure members, which, when they are actuated, reduce or leave free the cross-section of the above-mentioned passages, the device being characterized in that above a specific threshold of the speed of displacement of the piston in the cylinder the device reacts almost instantaneously by delivering the maximum absorption force which it is capable of providing, while for at least some of the values below that threshold the device brings only a minimum reaction force in opposition.

The device which is the subject of the invention thus makes it possible to achieve completely new applications of the system in the field of very high energies, and especially in the field of civil engineering, bridges and buildings, by offering anti-earthquake protection, in the field of railways for absorbing stresses transmitted to the track by a train braking very abruptly or in the case of accidents.

Among the advantages of the device of the invention, there will be noted in particular a very high degree of reliability over time, the miniaturisation of the system, and also an excellent resistance over a very wide range of temperatures, for example of the order of −25° C. to +40° C.

DESCRIPTION OF THE DRAWINGS

The invention, its implementation and its applications will be revealed more clearly by the description which follows with reference to the accompanying drawings, in which:

FIG. 1 illustrates, as indicated above, the principle of operation of a device of the prior art forming a damper with return spring effect, with hydrostatic compression of elastomer;

FIG. 2 shows another damper device of the prior art, with traversing piston, which does not have a return spring effect;

FIG. 5 shows diagrammatically an application of the invention to the stability of a deck member of a railway bridge resting on piles;

FIG. 6 shows another alternative embodiment;

FIG. 7 shows curves illustrating, as a function of the stroke of the piston (non-traversing piston) and of its speed of displacement in the cylinder, how the reaction force can evolve in such a device, constructed for example in accordance with the embodiment in FIG. 3;

FIG. 8 shows another alternative embodiment with traversing piston;

FIG. 12 is an illustration of a railroad bridge of which a detail is shown in FIG. 5 constructed in accordance with the present invention.

DESCRIPTION OF THE PREFERRED EMBODIMENTS

Figure 3:
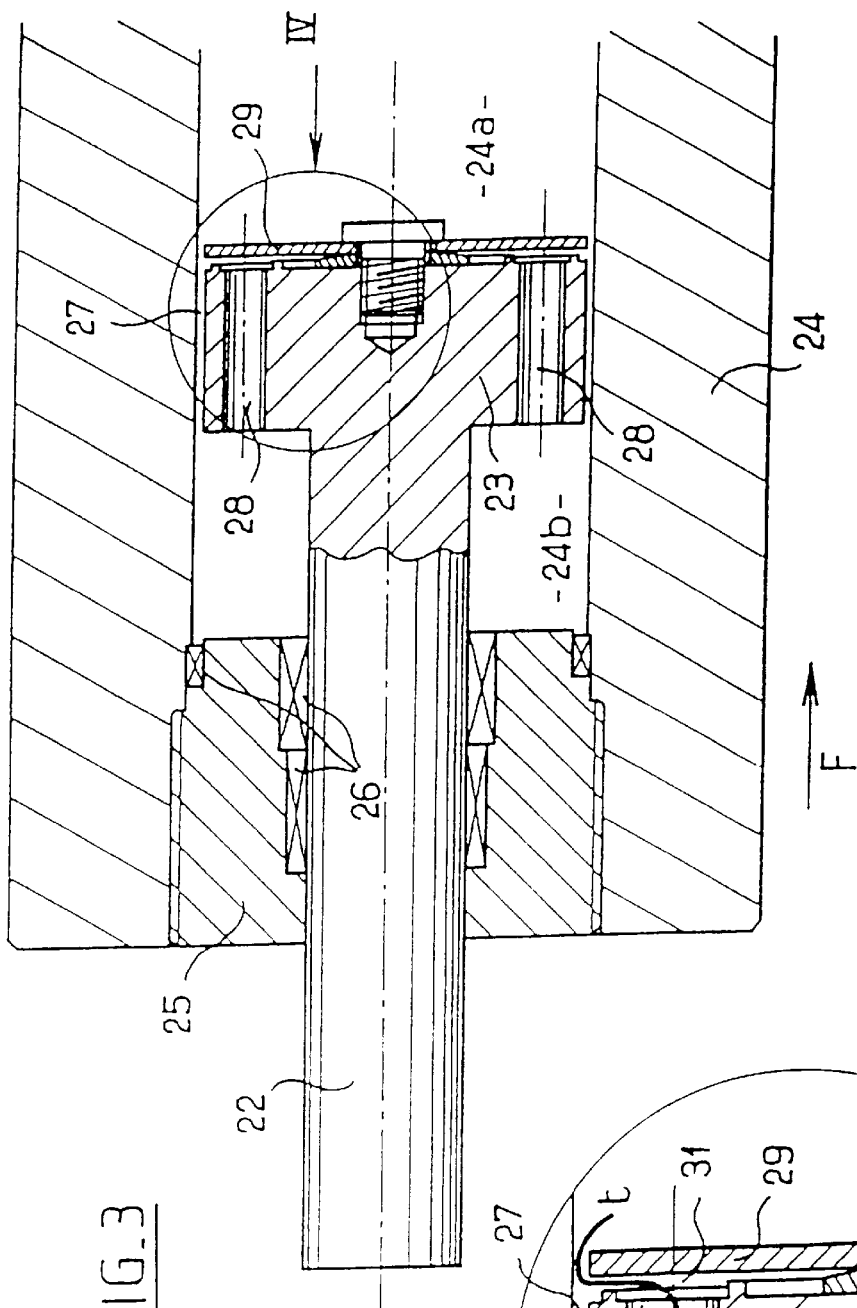
FIG. 3 shows in axial section a device of the prior art modified according to the invention.

Having already described the operation of the devices of the prior art illustrated in FIGS. 1 and 2, a description will now be given of the embodiment of a modified device such as is illustrated in FIG. 3.

There can be seen the piston rod 22 with its head 23 moving in a cylinder 24. The piston rod 22 slides in the cylinder 24 by means of a guide bush 25, for example screwed into the cylinder 24.

Sealing gaskets 26 prevent the escape of elastomer between the bush 25 and the chamber of the cylinder 24.

For the passage of the elastomer from one side of the piston head 23 to the other, an annular clearance 27 has been provided, the size of which is determined so as to provide the desired lamination effect.

As in the prior art of the embodiments in FIG. 1 and 2, the two chambers 24a, 24b, separated in the cylinder 24 by the head 23 of the piston may, under certain conditions, communicate with each other through passages 28 formed in the piston head from one side to the other.

These passages, not illustrated in FIGS. 1 and 2, are provided in a conventional manner and may be equipped with generally resilient closure members.

Figure 4:
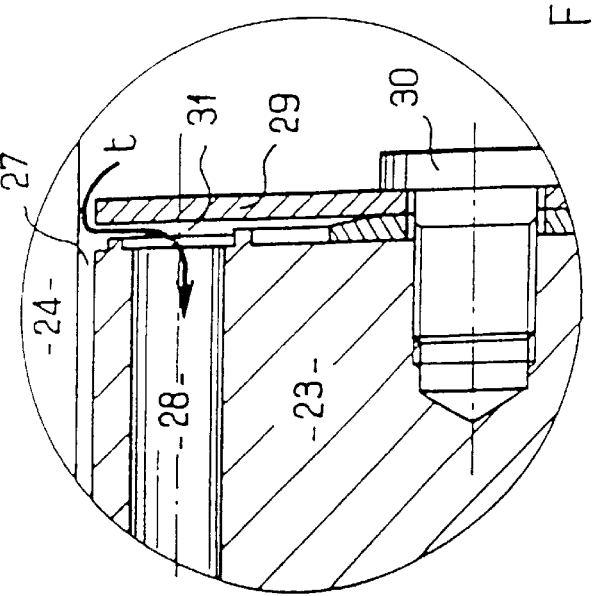
FIG. 4 shows on a larger scale the enclosed detail IV in FIG. 3.

In FIG. 3 there can therefore be seen, upstream of the passages 28, a metal washer 29, which can be seen more precisely in FIG. 4, placed in front of the passages, and held on the piston head for example by means of a screw 30.

During the operation of the device, the piston 22, 23 moves in the direction of the arrow F.

In the rest position of the device illustrated in FIGS. 3 and 4, and as can be seen more clearly in FIG. 4, the elastomer contained in the cylinder can pass freely from the chamber 24a to the chamber 24b, not only through the annular passage 27 but also and above all through the passages 28 along the escape path of the arrow t beneath the washer 29 which leaves between itself and the front face of the piston a clearance designated by 31 in FIG. 4.

According to the invention, the washer 29 is not a resilient washer in the sense in which it is customarily understood, being constituted of relatively thick steel, as will be indicated more precisely hereinafter.

Depending on the thickness of the washer, which will be carefully selected according to the desired operating threshold of the device, as will be explained more precisely hereinafter, as a result of a greater or lesser stress applied to it, the washer will be pressed against the front face of the piston 23, in this case blocking the ports 28.

The embodiment is such that the device will operate to a certain extent on an all or nothing basis, damping the stresses very little if the washer is not pressed against the passages, and damping them considerably if the washer is pressed against the front face of the piston, the pressing of the washer against the front face of the piston being effected almost instantaneously from the moment when the stress, and more generally the speed, of stressing on the device increases, while exceeding a predetermined threshold.

The device therefore corresponds to a certain extent to a device of the prior art which has been modified in such a way that it enters into action substantially only as from a specific minimum threshold, up to which it is almost inoperative, and beyond which it comes into action almost instantaneously at its predetermined level of operation.

Such a device may be used in particular on safety devices which have to come into action when shocks occur which have an intensity above a certain threshold.

The applications are numerous, especially in railway transport, for civil engineering, for damping shocks in very heavy machines or vehicles, for providing anti-earthquake protection for buildings, and for bridge spans etc.

Thus, in FIGS. 5 and 12 there is illustrated a particular application to the stability of a construction such as a railway bridge constituted by a plurality of cross-beams placed end to end and resting on piles.

In order not to overload the drawing, FIG. 5 illustrates only the adjacent parts of two deck members 31, 32 of a bridge resting on a pile 33, the deck member itself supporting a track, for example a railway track 34.

As is well known, the deck members, which are generally metal, must be allowed to expand freely, in response to the variations in temperature to which they may be subjected.

To this end, the deck members rest on the pile 33 by means of supports, such as the supports shown diagrammatically at 35 and 36.

A gap 37 separates the two deck members so as to allow for the required expansion clearance.

The problem is that, for example, if a railway train which has passed onto the bridge has to brake very abruptly, the kinetic energy of the braking, transmitted to the track, may cause tilting of the piles of the bridge, which will be subjected to the entraining stress which is transmitted to them by the deck member.

According to the invention, the problem is solved by placing between the adjacent deck member elements, coupling devices 38 constituted by devices forming dampers according to the invention and, for example, of the type illustrated in FIGS. 3 and 4.

The operation of the assembly is as follows.

In normal operation, no particular stress being transmitted to the deck members, the coupling elements 38 do not absorb any stress. The resilient washers 29 of the devices in FIGS. 3 and 4 constituting the couplers 38 are at rest, and everything occurs as if, in practice, the couplers did not exist, the passages paths 28 for the elastomer in the dampers having been provided with generous dimensions.

The deck member elements can therefore expand freely according to the temperature conditions prevailing on the bridge, the expansion stresses being very considerable, but the displacement speeds extremely low, for example below 1 mm/min.

On the other hand, in the event of very abrupt braking of a train on the bridge, the deck member, by reaction, will be entrained at a certain speed, for example of more than 3 mm/min., which will be sufficient to bring about almost instantaneous closure of the washer 29 of the associated coupler device.

Under these conditions, and step by step, all the couplers of the deck member being urged to close, the deck member of the bridge reacts to such stress as it if consisted of a single piece extending as far as the abutments of the bridge.

Consequently the piles are not stressed.

In another assembly, the forces to which a deck member is subjected could be brought onto the piles by mounting the damper device between the end of the deck member and the pile which supports it.

In such an assembly, the braking stress will be distributed in cascade fashion from pile to pile so as to distribute it over a sufficient number of piles to absorb the stress.

It will be noted that, depending on the type of construction, the indicated threshold of operation of the closure member closing the device may be greater than that indicated, for example 30 mm/min., or even 300 mm/min.

The operating characteristics of the device will be selected accordingly.

Referring now to FIG. 6, this illustrates yet another alternative form in which a piston head 43, moving in a cylinder 44 with an annular clearance 47, has passages 48 formed through it.

Upstream of these passages are arranged two resilient washers, 49 and 50, which comprise closure members spaced slightly from each other.

The washer 49 is solid and leaves a certain passage clearance 51 behind it with the passages 48, while the washer 50 is perforated, as can be seen at 52.

The operation of the device, with the piston moving in the direction F, is as follows.

When the displacement speed is low, the washers remain in the position illustrated, so that a large passage is left for the elastomer, rendering the device hardly effective at all, and even non-existent.

At a slightly higher displacement speed, the washer 49 will press against the front face of the piston 43, blocking the passages 48.

The elastomer has a tendency to pass from the chamber 44a to the chamber 44b essentially through the passages 52 and the annular passage 47; the operating situation is substantially that of a damper device of the prior art as illustrated in FIG. 1.

Nevertheless, taking into account the particular configuration of the thick washer 49, the modification in operation of the system is effected very abruptly, the device passing from a threshold of minimum stress to a second specific threshold.

This will become more clearly apparent hereinafter in relation to the operating curves illustrated.

At an even higher speed, the washer 50 will also flex, and the passages 52 will be blocked (by application against the washer 49).

Under these conditions, the elastomer will flow with greater difficulty from the chamber 44a to the chamber 44b, having to use in succession the annular passage, offered to it between the washer 50 and the cylindrical wall 44 of the chamber, and the annular passage 47.

The device will therefore operate with two levels of closure following a level of non-intervention.

The drawing in FIG. 6 is of course diagrammatic, and the spacings between the washers have been exaggerated so as to illustrate the system more clearly; in practice, they will be much reduced so as to permit the operation of the device as described above.

Although in FIG. 6 two spaced, superposed washers have been illustrated diagrammatically and discussed above, a device of equivalent operation could by formed by using, in place of circular washers, rectilinear blades arranged in the shape of a fan round the piston rod and which would block the ports formed opposite. FIG. 6 represents this structures as well.

For example, two such blades mounted in the form of a cross could block the first two ports 48 arranged opposite, and the second two further ports 48 likewise arranged diametrically opposite (for reasons of balance), the two blades having different flexibilities, for example by taking for one of them a steel thickness of 2 mm and for the other a steel thickness of 3.5 mm.

Such a device, operating with two levels of closure following a level of non-intervention, permits the free expansion of the system at a low speed level, damping with a specific stress at a second speed threshold, and quasi-blocking at a third, higher, speed threshold.

Referring to FIG. 7, this illustrates the operating curves for a device according to the invention, in which the reaction force of the device varies considerably, depending on the speed of application of the shock to the device.

For an application speed of 1 m/sec., 200 kN (kilo-Newtons) was noted, and for a shock speed of 1.5 m/sec., a force of 400 kN.

In the abscissae have been shown the strokes in millimetres of the devices which were experienced during the two shocks.

The device in question was of the type with one threshold illustrated in FIG. 3. A metal washer 29 was used of type 35 NCD 16 steel (nickel chrome, molybdenum) 5 mm thick with an axial clearance between washers and piston of 2 mm, the bore diameter of the chamber of the cylinder 24 was 103 mm and the diameter of the piston head 23 was 100 mm, therefore leaving an annular clearance 27 of 1.5 mm for lamination of the gum during the operation of the device.

The piston head 23 was perforated by three passages 28 evenly distributed round the piston (therefore at 120° C. to one another), the diameter of each passage 28 being 24 mm and the centre of each passage being located 80 mm from the central axis x'x of the device. Finally, the diameter of the piston rod 22 was 42 mm.

Returning to FIG. 7, it will be observed that the device reacts very rapidly, passing from a stress threshold of 200 kN for V=1 m/sec to 400 kN for a speed of 1.5 m/sec.

The curves in FIG. 7 likewise illustrate, after the stress has ceased, the return of the device to its rest state by decompression of the elastomer (in the case of a non-traversing piston).

For a traversing piston, the curves would be modified in the sense that there would be no return force by decompression of the elastomer effecting the return of the system.

An application of the device in the case in this figure could be that of the coupling of railway wagons.

For a displacement speed of 1 m/sec., on the curve C1 is found the operation corresponding to lamination of the gum passing in parallel fashion into the annular passage 27 and through the passages 28.

For a higher speed of stressing of the device, for example for a coupling speed of 1.5 m/sec, the reaction of the device is illustrated by the curve C2. The stress applied by the elastomer has flexed the washer 29 blocking the passages 28, the elastomer then being able to continue to pass only through the annular clearance left between the chamber and the periphery of the piston 23.

FIG. 7 shows clearly the advantage of the device of the invention, which makes it possible, substantially from the start of the stroke, to cause the device to operate under the desired maximum absorption force, which increases the efficiency of the device.

Reference will now be made to the alternative embodiment with traversing piston illustrated in FIG. 8.

In this Figure can be seen a traversing piston with its rod 62 and its head 63 defining in the cylinder 64 two chambers 64a, 64b for the elastomer.

The piston 62 traverses the two ends of the chamber 64 in bushes 65, 65', screwed to each end of the cylinder 64, the sealing gaskets 66, 66' preventing the escape of elastomer to the outside.

Each piston 63 has a certain number of axial passages 68, for example three in number, distributed at 120° round the axis x'x of the device.

Opposite the passages 68 can be seen a washer 71, the operation of which is similar to that of the washer 29 in FIGS. 3 and 4 or the washer 49 in FIG. 6.

The washer 71 is held in place on the head of the piston by means of a nut 72 screwed onto a corresponding threaded portion of the head 62 of the piston.

Between the washer 72 and the opposed face of the piston 63 is left a clearance with the reference $\epsilon$ on the drawing, for the passage of the gum, this clearance being equivalent to the clearance 31 in FIG. 4 or 51 in FIG. 6.

If the device is to have a double action, that is to say, in both directions, a symmetrical assembly is advantageously provided round the head 63 of the piston with a washer 71' and a nut 72' as indicated by dash/dotted lines.

In the embodiment described here, it will be noted that the nut 72 (72') forms a shield for the washer 71 (71') during the actuation of the system.

At low operating speeds, and as indicated previously, the washers 71, 71' are substantially not deformed, whether the device is displaced in the direction F or in the opposite direction F'.

At displacement speeds exceeding a certain threshold, the pressure of the elastomer on the washers, depending on the direction of displacement (the washer 71 if the piston is displaced in the direction F, or the washer 71' if the piston moves in the direction F') deforms the washer and presses it against the passages 68.

This action is almost immediate. In fact, taking into account the high viscosity of the elastomers used starting from a certain clearance which is less than $\epsilon$, the pressure difference between the two faces of the washer 71 increases very abruptly. The washer 71 is then applied immediately to the piston head 63.

This action is so much the more rapid in that the nut 72 (72') placed in front of the washer 71 (71') limits the action of the elastomer on the free periphery of the washer; as soon as the latter has flexed by a certain play, the forces are then applied over the entire surface of the washer.

There is thus obtained an even more rapid operation of the system which passes very abruptly from a threshold of non-intervention to the specific level of intervention.

Figure 9:
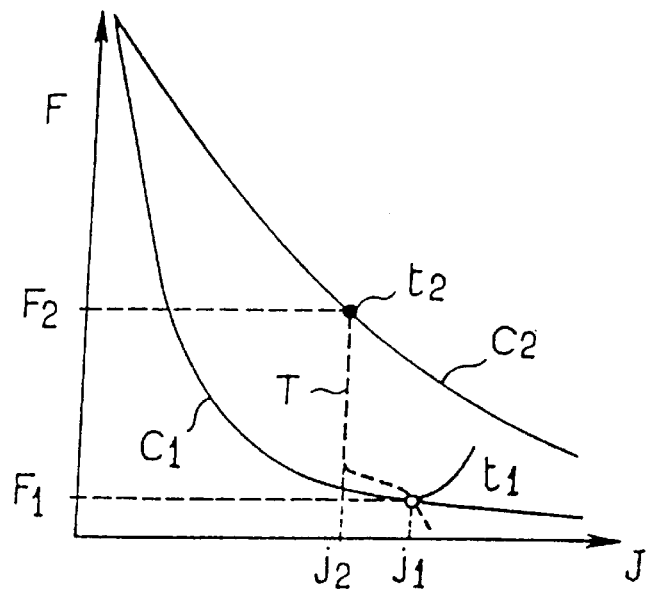
FIG. 9 illustrates in a force/gum passage clearance diagram how the device of the invention functions when it is subjected to different operating conditions.

FIG. 9 illustrates curves showing how a device of the type described with respect to FIG. 3 operates in response to the increasing speeds V1, V2 of application of the force F acting on the system.

Entered in the abscissae are the values J of the clearance permitting the passage of the gum, for example in terms of area in $mm^2$, and entered in the ordinates are the reaction forces, for example in newtons.

No value has been indicated insofar as the curves illustrate the general operation of the device, the values obviously depending on the dimensions selected, on the nature of the elastomer, and on the pressures to which it is subjected, etc.

The two curves C1 and C2 correspond to the reaction forces F of the damper at the respective operation speeds V1 and V2, depending on the passage clearance allowed for the gum.

The curve T in dashed lines indicates the curve obtained with the device which involves a reduction of the clearance by the action of the flexing of the washer 29.

The two points t1 and t2 of the curve T correspond to the values of the clearance of the device for the operating speeds V1 and V2.

In the example given, it has been assumed that at the first speed V1, the washer 29 had substantially not flexed, while at the speed V2 the washer 29 had flexed.

As explained previously, the flexing of the washers occurs very abruptly, the device operating to a certain extent on an all or nothing basis for each operating threshold.

The operation of the device is as follows.

At a speed below V1, the washer 29 in FIG. 3 has not flexed; the clearance is at maximum, and the reaction force of the device is at minimum; everything happens substantially as though no damping device were present.

At a stressing speed equal to V1, the washer 29 has not flexed and one is at the point of operation t1 on the curve C1.

The reaction force of the device occurs at the level F1.

At a stressing speed V2 above V1, the washer 29 will flex. One thus passes rapidly from the point t1 to the point t2 on the curve C2, where the reaction force F2 of the device for the clearance J2 can be noted in the ordinates.

The curves in FIG. 9 make it possible to understand that according to the invention it is thus possible to adapt at will, in response to a variable parameter, such as the speed of absorption of a shock to which the device is subjected, for example a maximum threshold value of the stress which must be absorbed by the device in order to obtain the absorption of the shock under the best possible conditions.

In the example of the coupling of railway wagons, the device can thus act with a damping force which will not cause damage to personnel or to the goods transported, up to a certain speed threshold, and with a greater damping force in the case of a serious accident in order to reduce damage as far as possible.

In an application to civil engineering, or to protection against earthquakes, the device used will generally have a single threshold, for example of the type illustrated in FIGS. 3, 4 and 8, permitting free expansion and free movement at very low speeds (generally in order to take up the thermal expansion clearances) and on the other hand, at a higher speed, exceeding a specific threshold, providing absorption at the maximum threshold which may correspond to quasi-blocking.

For example, for a device having a piston and cylinder of the dimensions indicated above, and operating according to the principle of FIG. 3 or 8 with a single steel washer 3.5 mm thick, it was possible to obtain a device bringing no notable resistance in opposition at speeds below 1 mm/min. and on the other hand bringing a reaction force of more than 175 tonnes in opposition at a stressing speed of more than 3 mm/min., the device acting almost instantaneously before it has carried out a stroke of 1 mm.

Figure 10:
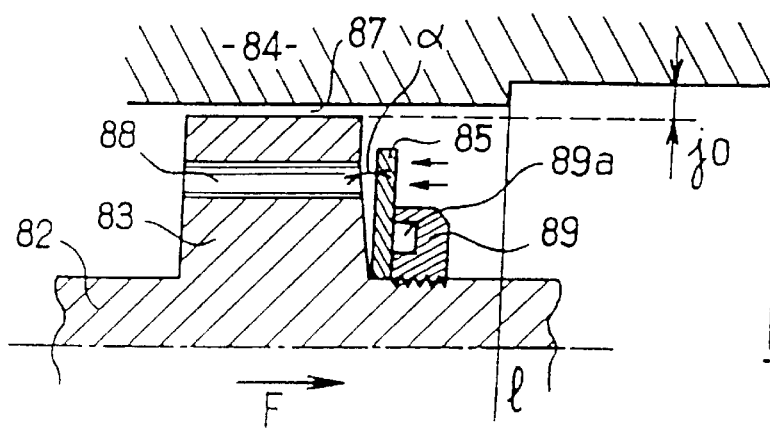
FIG. 10 shows an alternative embodiment for a device similar to that in FIG. 8.

In the alternative embodiment illustrated in FIG. 10, a piston rod 82 of the device (which has been illustrated here as a traversing device, like that in FIG. 8), is equipped on the front face of the device (assuming that F indicates the direction of movement of the piston in the cylinder) with a deformable washer 85, located upstream of passages 88 passing through the head of the piston.

At 87 is indicated the annular clearance formed between the chamber of the cylinder 84 and the head of the piston providing the lamination of the gum as in the device described previously.

The washer 85 is pressed against the front face of the head of the piston 83, for example by means of a nut 89 additionally forming a shield making it possible to adapt the device to a specific triggering speed and improving the operation, on an all or nothing basis, of the closure of the washer 85, as explained previously.

In the example illustrated, it can be seen that the forward head of the piston is slightly inclined towards the rear, from the centre towards the periphery, so that as the washer 85 is a flat washer, a clearance extending in a crescent will be formed between the washer 85 and the head of the piston, at an acute angle a which may be, for example, of the order of 10°.

The angle in fact serves to provide a good support in order to ensure durability of the washer.

With an apparatus having an inside diameter $\phi=170$ mm, for an actuating speed of more than 5 mm/min. a reaction force of the device of 1750 kN is obtained, while for a stressing speed of less than 1 mm/min., the force is reduced to 60 kN.

As indicated previously, the washer thus configured and supported by the nut 29 forming a shield reacts almost instantaneously in flexion, so that the device passes almost without transition from a position in which it allows free expansion of the system to a position in which it applies a maximum reaction force. The nut 89 forming a shield may advantageously be shaped with a throat as illustrated at 89a which reduces the response time by actuating the device by favouring, from the start of the flexing of the washer, the establishment of the over-pressure of the elastomer beneath the shield.

It is clear that with such an arrangement, by suitable selection of the quality of the washer 85, that is to say, for example, the grade and thickness of steel which will constitute it, and the size of any possible shield, it is possible to obtain the desired flexion of the washer in order to block the passages 88 at a specific speed.

For the operation of the device in FIG. 10, curves will be found which are altogether similar to those illustrated in FIG. 9.

In FIG. 10 it can also be seen that, starting from a certain stroke value, designated by 1, the diameter of the chamber 84 increases slightly, the annular clearance 87 increasing in parallel fashion up to the value jo.

If such an arrangement is adopted, at the end of the operating stroke of the device, the maximum stress will therefore decrease; such an arrangement can be useful in order to limit the stress after a certain stroke and permit the lifting away of the washer pressed against the piston head during the operation of the system and therefore the return of the system to its initial position.

Such a device may react, for example, by allowing deformation to occur substantially freely when the speed does not exceed a specific threshold and, on the other hand, providing a considerable stress, without significant displacement of the piston in its cylinder, as soon as the speed exceeds the threshold value which can be selected at will, for example within a range of from 3 mm/min. (very low speed) to 300 mm/min. (slightly higher speed), depending on the applications.

In an example of execution, reaction forces of the device of the order of 1750 kN were obtained for an actuating value of the speed of more than 3 mm/min. with a very limited displacement of the order of 1 to 3 mm, the same device, at a displacement speed which is of the order of 1 mm/min., allowing the device to move freely, for example over a stroke of 100 mm, with a maximum reaction force not exceeding 30 kN.

Among other examples of application, there may be mentioned in particular the suspension stops of very heavy vehicles, such as tanks or public works vehicles.

It will be noted that the operation of the devices of the invention is effective for wide variations in temperature, and that the high pressures used, from several hundred to several thousand bar, limit the compressibility of the elastomers and therefore the reaction time of the devices.

Figure 11:
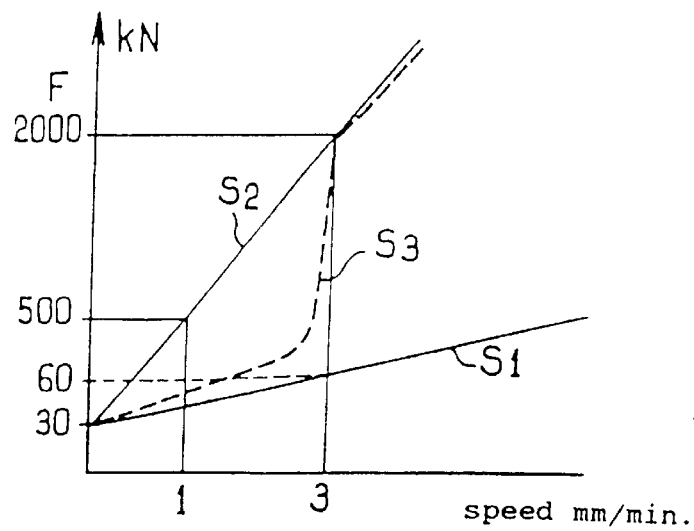
FIG. 11 shows curves giving, as a function of the piston/cylinder displacement speed entered in abscissae in mm/min., the reaction force of the device entered in ordinates in kN (kiloNewtons)

FIG. 11 illustrates the reaction curve of the device which can be applied, for example, to stabilize a bridge deck member as explained in relation to the description of FIG. 5.

In this Figure, the speed of displacement of the piston in its cylinder has been shown in mm/min. in the abscissae and the reaction force in kN in the ordinates.

The curve S1, which is almost linear, illustrates the reaction force of a damper device such as, for example, that illustrated in FIG. 8 but which would be devoid of the washer forming a blocking closure member having the reference 71.

In the same way, the curve S2, almost linear, illustrates the reaction of the same device but which would be devoid of the passages passing through the piston head and having the reference 68.

With a device according to the operation of the curve S1, for a reaction speed of 3 mm/min., a maximum reaction force of the order of 60 kN will be obtained.

With a device according to the operation of the curve S2, for the stressing speed of 3 mm/min. a reaction force of 2000 kN, or the desired force, will be obtained; and for a displacement speed of 1 mm/min., corresponding to a customary expansion speed, the reaction force of the device will be more than 500 kN, which will be unacceptable (it will be noted that in FIG. 11 the scale of the forces has not been observed for the sake of greater clarity of the illustration).

With the device of the invention, that is to say, including passages provided through the piston and having closure members operating on an all or nothing basis, the operating curve becomes the curve S3 shown by broken lines.

It will be noted that the curve S3 substantially follows the curve S1 at the start, and when the stressing speed reaches 3 mm/min, the curve is deformed and catches up on the curve S2 by rising substantially vertically parallel to the axis of the ordinates.

The system therefore reacts at the start, for the low speeds, as if the passages 68 through the head of the piston were free, but reacting very abruptly and operating by allowing the elastomer to pass only through the annular passage between piston and cylinder as soon as the speed reaches or exceeds 3 mm/min.

In other words, such a device can react, for example, by allowing the deformation to occur substantially freely when the speed does not exceed a specific threshold, and on the other hand providing a considerable effort, corresponding to quasi-blocking and occurring almost immediately as soon as the speed exceeds a threshold speed which may be selected arbitrarily to be as low as desired.

In the examples which have been given, the means for modification of the passage cross-section were deformable resistant mechanical means such as steel washers or blades which reacted directly, depending on their configuration, in response to the deformation and/or displacement stresses which were applied to them directly by the elastomer.

Advantageously, means forming a shield made it possible to adapt the stress to the washer or blade and to increase this stress at the start of deformation of the resistant means in order to accelerate the process of closure of the closure members thus constituted.

It is of course possible also to provide, optionally on a complementary basis, for these means for modification of the passage cross-section to be means that can be controlled from the outside or by any type of programmed control or monitoring devices.

For example, these means could be closure members controlled from outside by detectors associated with the device and which would close the closure members partially or completely in response to the measurements registered.

The advantage of the device of the invention is that whatever the magnitude of the shock in question, the device can return to its starting position and is not destroyed by the shock.

In particular for protection against earthquakes, the device can damp not only the first seismic wave but the after-shock, its repetitions.

In the various examples given and illustrated, there have essentially been shown as means for modification of the passage cross-section, metallic washers of more or less different quality and configuration; but it has also been indicated that in place of washers it would be possible to use, for example, blades which are more or less flexible, and more or less rigid, forming closure members simultaneously or successively blocking, at different stress thresholds, one or more passages through the head of the piston.

Advantageously, such blades will be in the form of rectilinear or cruciform tongues.

The devices may have a traversing piston or a non-traversing piston; the advantage of the traversing devices is that they operate in both directions; the advantage of the non-traversing devices is that the pressure of the elastomer automatically provides the return function of the device after operation.

I claim:

1. A high energy damper for absorbing abruptly applied force comprising,
a cylinder having an axis and filled with an elastomeric gum under high pressure; a piston head mounted in said cylinder having an annular clearance with said cylinder permitting a selected flow of said elastomeric gum, said piston head defining first and second chambers in said cylinder on opposite axial sides of said piston head in said cylinder; passages in said cylinder head each included in an escape path from said first chamber to said second chamber; a piston rod for applying axial force to said piston head; and a first closure means supported by said piston head, said first closure means being deflectable to block said escape path when forced against said elastomeric gum at least above a threshold velocity, said first closure means being rigid such that said escape paths are substantially unimpeded when said piston head moves at a rate below the threshold velocity, said annular clearance and thickness of said first closure means being proportioned for defining the threshold velocity.

2. The high energy damper according to claim 1 wherein said first closure means comprises a steel washer in axial registration with said passages.

3. The high energy damper according to claim 2 further comprising a spacer placed between said piston head and said closure means for maintaining said washer at an axial distance from said piston head, and wherein said escape path comprises space between said washer and said piston head.

4. The high energy damper according to claim 2 wherein said washer is 2 mm to 5 mm thick.

5. The high energy damper according to claim 2 in which said cylinder is constructed with adjacent axial lengths having first and second respective values of said annular clearance of said piston head with said cylinder.

6. The high energy damper according to claim 1 wherein a side of said piston head facing said closure means decreases in axial length with radial distance from the axis, and a threaded fastener holds the closure means against a radial center of said piston head.

7. The high energy damper according to claim 6 wherein a side of said fastening means bearing against said closure means comprises a recess.

8. The high energy damper according to claim 1 said closure means comprises a fan shaped arrangement of rectilinear blades each in axial registration with a passage.

9. The high energy damper according to claim 1 wherein said passages comprise axial bores.

10. The high energy damping means according to claim 1 further comprising a second closure means axially displaced from a side of said first closure means facing away from said piston, said second closure means having annular clearance with said cylinder, said second closure means remaining in a first position relative to said piston head above the threshold velocity, said second closure means comprising an aperture defining in cooperation with said annular clearance around said piston head a path from said first chamber to said second chamber, said second closure means being proportioned to deflect at a second threshold velocity and close said aperture.

11. The high energy damper according to claim 1 wherein said elastomeric gum is pressurized at 1–4000 bar.

12. In a railway bridge, deck members formed by a plurality of cross beams mounted end to end; piles supporting said deck members, said deck members being coupled to one another by respective high energy dampers according to claim 1, wherein force is applied to each of said piston rods of said dampers by traffic on the bridge.

* * * * *